(12) United States Patent
Huang

(10) Patent No.: US 8,854,025 B2
(45) Date of Patent: Oct. 7, 2014

(54) SWITCHING POWER SUPPLY

(71) Applicants: Fu Tai Hua Industry (Shenzhen) Co., Ltd., Shenzhen (CN); Hon Hai Precision Industry Co., Ltd., New Taipei (TW)

(72) Inventor: Ren-Wen Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/714,630

(22) Filed: Dec. 14, 2012

(65) Prior Publication Data
US 2013/0154596 A1   Jun. 20, 2013

(30) Foreign Application Priority Data

Dec. 16, 2011  (CN) .......................... 2011 1 0422974

(51) Int. Cl.
*G05F 1/46* (2006.01)
(52) U.S. Cl.
CPC ...................................... *G05F 1/468* (2013.01)
USPC ......................................................... 323/282
(58) Field of Classification Search
USPC .......................... 323/273, 276, 280, 282, 283
See application file for complete search history.

(56) References Cited

U.S. PATENT DOCUMENTS

| | | | | |
|---|---|---|---|---|
| 4,796,147 A | * | 1/1989 | Anderson et al. | 361/92 |
| 6,650,097 B2 | * | 11/2003 | Sakurai | 323/279 |
| 8,299,773 B2 | * | 10/2012 | Jang et al. | 323/299 |
| 8,472,220 B2 | * | 6/2013 | Garrity et al. | 363/95 |
| 2011/0267734 A1 | * | 11/2011 | Inoue et al. | 361/160 |

* cited by examiner

*Primary Examiner* — Adolf Berhane
(74) *Attorney, Agent, or Firm* — Novak Druce Connolly Bove + Quigg LLP

(57) ABSTRACT

A switching power supply includes an input terminal, a voltage converter, a feedback circuit, and a pulse width modulation (PWM) controller. The input terminal receives a first direct current (DC) voltage. The voltage converter transforms the first DC voltage into a second DC voltage and provides the second DC voltage to a load via transmission lines. The feedback circuit is configured for detecting voltage lost across the transmission lines. The PWM controller controls the voltage converter to adjust the second DC voltage according to the voltage loss.

13 Claims, 2 Drawing Sheets

US 8,854,025 B2

SWITCHING POWER SUPPLY

TECHNICAL FIELD

Embodiments of the present disclosure relate to a switching power supply.

DESCRIPTION OF RELATED ART

Nowadays, portable electronic apparatuses, such as mobile phones, are widely used. When a battery of a mobile phone is low, a switching power supply, plugged into a mains power source, provides a charging voltage to charge the battery of the mobile phone. However, the switching power supply is normally connected to the mobile phone via wires, which also have resistance. When the battery of a mobile phone is charged, voltage loss across the wires because of resistance may decrease the charging voltage to be less than a standard charging voltage.

Thus, a need exists to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
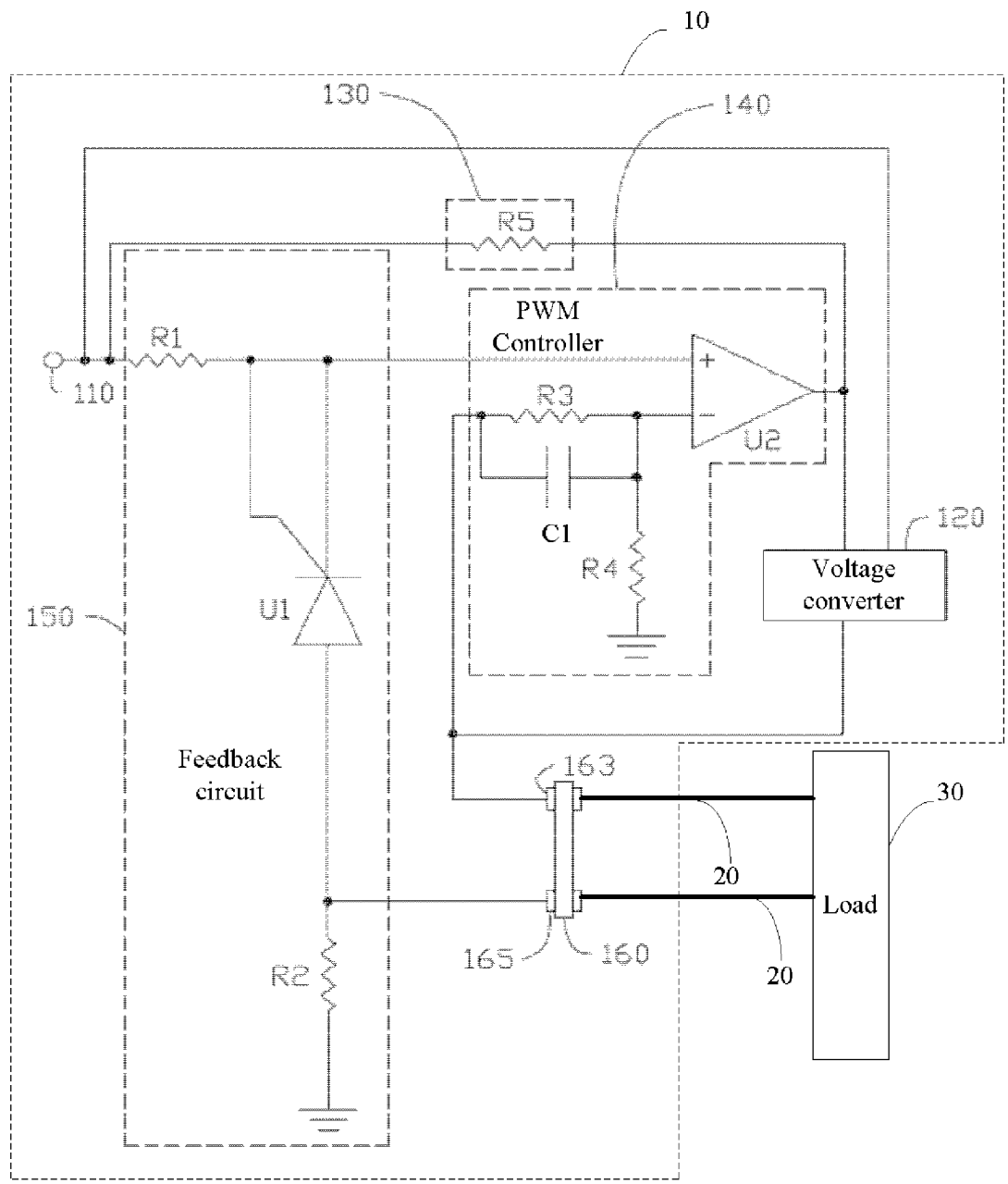
FIG. 1 is a circuit diagram of a switching power supply of one embodiment of present disclosure, the switching power supply including a voltage converter.

FIG. 1 is a circuit diagram of a switching power supply 10 of one embodiment of the present disclosure, the switching power supply including a voltage converter. The switching power supply 10 is configured to generate operating voltages and provide the operating voltages to a load 30 via transmission lines 20.

The switching power supply 10 includes an input terminal 110 configured for receiving a first direct current (DC) voltage, a voltage converter 120 configured for transforming the first DC voltage into a second DC voltage, a feedback circuit 150 configured for detecting a voltage loss across the transmission lines 20, a pulse width modulation (PWM) controller 140 configured for adjusting the second DC voltage according to the voltage loss, and an output interface 160 configured for providing the second DC voltage to the load 30 via the transmission lines 20. The second DC voltage functions as the operation voltages of the load 30. In this embodiment, the first DC voltage is about 12 volts and the second DC voltage is about 5 volts.

Figure 2:
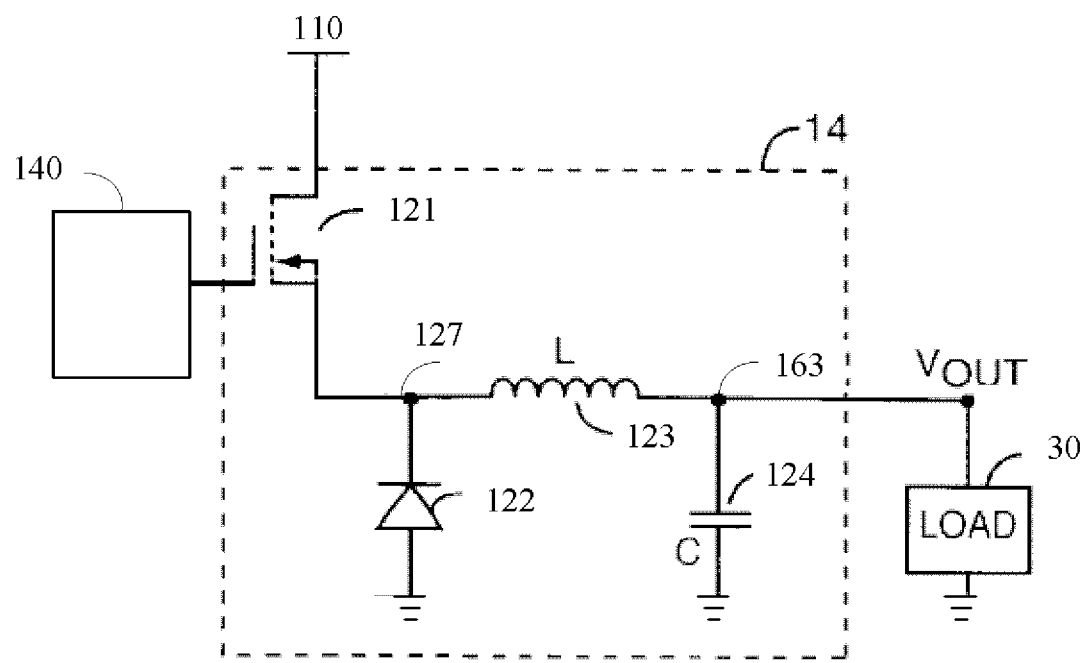
FIG. 2 is a circuit diagram of the voltage converter of FIG. 1.

Referring also to FIG. 2, in this embodiment, the voltage converter 120 is a buck converter and includes a transistor 121, a diode 122 having a cathode and a grounded anode, an inductor 123, and a capacitor 124. A gate of the transistor 121 is connected to the PWM controller 140 for receiving a PWM signal. The input terminal 110 is connected to the cathode of the diode 122 via the transistor 121. The cathode of the diode 122 is connected to a first output terminal 163 of the output interface 160 via the inductor 123. The first output terminal 163 is grounded via the capacitor 124. Alternatively, the voltage converter 120 may also be a typical synchronous converter.

The feedback circuit 150 includes a first resistor R1, a second resistor R2, and a reference voltage source U1. The reference voltage source U1 includes a control terminal connected to the input terminal 110 via the first resistor R1, a cathode connected to the input terminal 110 via the first resistor R1, and an anode grounded via the second resistor R2. The anode is also connected to a second output terminal 165 of the output interface 160.

The PWM controller 140 includes a comparator U2, a third resistor R3, and a fourth resistor R4. A non-inverting input of the comparator U2 is connected to the cathode of the reference voltage source U1. An inverting input of the comparator U2 is grounded via the fourth resistor R4. The inverting input of the comparator U2 is also connected to the first output terminal 163 via the third resistor R3. An output of the comparator U2 is connected to the voltage converter 120 and connected to the input terminal 110 via a fifth resistor R5 which functions as a voltage pull-up circuit. In this embodiment, the output of the comparator U2 is connected to the gate of the transistor 121 as shown in FIG. 2. In one embodiment, a capacitor C1 is connected in parallel with the third resistor R3 to filter out pulses in the second DC voltage. In alternative embodiments, the fifth resistor R5 may be omitted when the pulse signal output to the voltage is high enough. In this instance, the resistances of the third and the fourth resistors are equal.

In one embodiment, the input terminal 110 receives a first DC voltage, such as a 12 volt DC voltage. An initial second DC voltage outputted from the voltage converter 120 is about 5 volts. Since resistances of the third and the fourth resistor are equal, the inverting input of the comparator U2 receives a voltage of about 2.5 volts. The reference voltage source U1 may provide a stable first reference voltage V1, such as 2.5 volts, across the cathode and the anode of the reference voltage source U1. The second resistor R2 is set according to the resistance of the wires 20, for example 0.2 ohms. In this embodiment, assuming a current rating of the load 30 is 1 ampere, voltage loss of the transmission lines 20 is about 0.2 volts, a second reference voltage V2 across the second resistor R2 may be detected by the second resistor R2 and can be calculated according to the formula V2=R2*I1=0.2 volts. The second reference voltage V2 plus the first reference voltage V1 is provided to the non-inverting input of the comparator U2. In other words, the non-inverting input receives a voltage of about 2.7 volts. Under this condition, the comparator U2 increases a pulse ratio of the PWM signal according to a voltage difference between the non-inverting input and the inverting input. The voltage converter 120 then increases the second DC voltage according to the PWM signal with increased pulse ratio. In this embodiment, the second DC voltage may be increased to about 5.2 volts to compensate for the 0.2 volt loss of the transmission lines 20. Since the second reference voltage V2 may change in proportion to the voltage lost on the transmission lines 20, the switching power supply 10 may appropriately compensate for the voltage lost on the transmission lines 20 even when a different load 30 is being driven.

Even though numerous characteristics and advantages of certain inventive embodiments have been set out in the foregoing description, together with details of the circuit and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. A switching power supply comprising:
an input terminal receiving a first direct current (DC) voltage;
a voltage converter receiving and transforming the first DC voltage into a second DC voltage, and providing the second DC voltage to a load via transmission lines;
a feedback circuit detecting a voltage loss across the transmission lines, wherein the feedback circuit comprises a first resistor, a second resistor, and a reference voltage source, the reference voltage source comprises a control terminal connected to the input terminal via the first resistor, a cathode connected to the input terminal via the first resistor, and an anode grounded via the second resistor; and
a pulse width modulation (PWM) controller providing PWM signal to the voltage converter, and controlling the voltage converter to compensate the second DC voltage according to the voltage loss.

2. The switching power supply of claim 1, further comprising an output interface connected to the voltage converter, wherein the output interface comprises a first output terminal for outputting the second DC voltage and a second output terminal.

3. The switching power supply of claim 2, wherein the first output terminal and the second output terminal of the output interface are connected to the load via two transmission lines, correspondingly.

4. The switching power supply of claim 2, wherein the voltage converter is a buck converter.

5. The switching power supply of claim 4, wherein the buck converter comprises a transistor, a diode having a cathode and a grounded anode, an inductor, and a capacitor, the input terminal is connected to the cathode of the diode via the transistor, a gate of the transistor is connected to the PWM controller for receiving the PWM signal, the cathode of the diode is connected to the first output terminal of the output interface via the inductor, the first output terminal of the output interface is grounded via the capacitor.

6. The switching power supply of claim 2, wherein the anode of the reference voltage source is connected to the second output terminal of the output interface.

7. The switching power supply of claim 6, wherein the PWM controller further comprises a comparator, a noninverting input of the comparator receives a first reference voltage plus a second reference voltage, and an inverting input of the comparator receives the second DC voltage.

8. The switching power supply of claim 7, wherein the first reference voltage is a voltage between the anode and the cathode of the reference voltage source, and the second reference voltage is a voltage across the second resistor.

9. The switching power supply of claim 7, wherein the noninverting input of the comparator is connected to the cathode of the reference voltage source.

10. The switching power supply of claim 9, wherein the PWM controller further comprises a third resistor and a fourth resistor, the inverting input of the comparator is grounded via the fourth resistor, the inverting input of the comparator is connected to the first output terminal of the output interface via the third resistor for receiving the second DC voltage.

11. The switching power supply of claim 10, wherein an output of the comparator is connected to the voltage converter for providing the PWM signal to the voltage converter.

12. The switching power supply of claim 10, wherein the PWM controller further comprises a capacitor connected in parallel with the third resistor.

13. A switching power supply comprising:
an input terminal receiving a first direct current (DC) voltage;
a voltage converter receiving and transforming the first DC voltage into a second DC voltage, and providing the second DC voltage to a load via transmission lines, wherein the voltage converter comprises a transistor, a diode having a cathode and a grounded anode, an inductor, and a capacitor, the input terminal is connected to the cathode of the diode via the transistor, a gate of the transistor is connected to the PWM controller for receiving the PWM signal, the cathode of the diode is connected to the first output terminal of the output interface via the inductor, the first output terminal of the output interface is grounded via the capacitor;
a feedback circuit detecting a voltage loss across the transmission lines; and
a pulse width modulation (PWM) controller providing PWM signal to the voltage converter, and controlling the voltage converter to compensate the second DC voltage according to the voltage loss.

* * * * *